(12) United States Patent
Schoefberger et al.

(10) Patent No.: US 10,443,667 B2
(45) Date of Patent: Oct. 15, 2019

(54) DISK BRAKE FOR A UTILITY VEHICLE

(71) Applicant: KNORR-BREMSE Systeme fuer Nutzfahrzeuge GmbH, Munich (DE)

(72) Inventors: Tobias Schoefberger, Mainburg (DE); Rudolf Fischer, Erding (DE); Peter Balint, Grafenau (DE); Matthias Klingner, Moorenweis (DE); Michael Peschel, Schoengeising (DE); Ralf Weber, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 57 days.

(21) Appl. No.: 15/708,790

(22) Filed: Sep. 19, 2017

(65) Prior Publication Data

US 2018/0003253 A1    Jan. 4, 2018

Related U.S. Application Data

(63) Continuation of application No. PCT/EP2016/055908, filed on Mar. 18, 2016.

(30) Foreign Application Priority Data

Mar. 20, 2015    (DE) .......................... 10 2015 104 183

(51) Int. Cl.
*F16D 65/56*    (2006.01)
*F16D 65/18*    (2006.01)
(Continued)

(52) U.S. Cl.
CPC ....... *F16D 65/568* (2013.01); *F16D 55/2265* (2013.01); *F16D 65/0979* (2013.01);
(Continued)

(58) Field of Classification Search
CPC .. F16D 65/568; F16D 65/183; F16D 65/0979; F16D 55/2265; F16D 2121/14; F16D 2125/40; F16D 2125/26
(Continued)

(56) References Cited

U.S. PATENT DOCUMENTS 5,568,845  A  * 10/1996  Baumgartner ........ F16D 55/227
                                                         188/196 D
6,269,914  B1    8/2001  Angerfors
(Continued)

FOREIGN PATENT DOCUMENTS

CN    203702943 U    7/2014
CN    104254705 A    12/2014
(Continued)

OTHER PUBLICATIONS

Specification translation of WO document No. 2013/143978, obtained from website: https://worldwide.espacenet.com/ on Jan. 9, 2018.*
(Continued)

*Primary Examiner* — Pamela Rodriguez
(74) *Attorney, Agent, or Firm* — Crowell & Moring LLP

(57) ABSTRACT

A disk brake with lower cost and improved maintainability is provided. The brake caliper includes at least one actuating device for actuating the disc brake using a moveably guided bridge. The bridge has at least one threaded hole into which an actuating spindle is displaceably located. A brake disk end of the actuating spindle penetrates a caliper closing plate facing the brake disk. The positioning spindle carries a rotatably-mounted pressure piece which presses a brake pad against the brake disc. The opening is sealed by a bellows retained on the brake caliper on one side and on the pressure piece on the other side. A securing ring non-rotatably located on the actuating spindle and rotatably connected to the thrust piece interacts with the bellows during brake application
(Continued)

and/or release to maintain a desired air gap between the brake disk and brake pad.

15 Claims, 6 Drawing Sheets

(51) Int. Cl.
    *F16D 55/2265*     (2006.01)
    *F16D 65/097*     (2006.01)
    *F16D 121/14*     (2012.01)
    *F16D 125/26*     (2012.01)
    *F16D 125/40*     (2012.01)

(52) U.S. Cl.
    CPC ........ *F16D 65/183* (2013.01); *F16D 2121/14* (2013.01); *F16D 2125/26* (2013.01); *F16D 2125/40* (2013.01)

(58) Field of Classification Search
USPC ...... 188/71.9, 71.7, 71.8, 196 F, 196 V, 369, 188/73.38
See application file for complete search history.

(56) References Cited

U.S. PATENT DOCUMENTS

| | | | | |
|---|---|---|---|---|
| 7,331,431 | B2 * | 2/2008 | Fischer | F16D 65/183 |
| | | | | 188/196 D |
| 8,910,755 | B2 | 12/2014 | Baumgartner et al. | |
| 2004/0163899 | A1 * | 8/2004 | Heinlein | F16D 65/0978 |
| | | | | 188/72.1 |
| 2005/0034935 | A1 * | 2/2005 | Maehara | F16D 65/18 |
| | | | | 188/71.9 |
| 2006/0144652 | A1 * | 7/2006 | Wimmer | F16D 65/568 |
| | | | | 188/73.38 |
| 2015/0008078 | A1 | 1/2015 | Asen et al. | |
| 2018/0259021 | A1 * | 9/2018 | Weber | F16D 55/2255 |

FOREIGN PATENT DOCUMENTS

| | | |
|---|---|---|
| DE | 42 12 352 A1 | 10/1993 |
| DE | 94 22 342 U1 | 4/2000 |
| DE | 696 10 094 T2 | 4/2001 |
| DE | 10 2008 010 462 A1 | 8/2009 |
| DE | 102015105344 A1 * | 2/2016 |
| EP | 2 093 451 B1 | 1/2010 |
| EP | 2 294 329 B1 | 11/2011 |
| EP | 2 410 198 A1 | 1/2012 |
| WO | WO-2013/143978 A1 * | 10/2013 |

OTHER PUBLICATIONS

Specification translation of DE document No. 102015105344, obtained from website: https://worldwide.espacenet.com/ on Jan. 9, 2018.*
International Search Report (PCT/ISA/210) issued in PCT Application No. PCT/EP2016/055908 dated Jun. 2, 2016 with English translation (Four (4) pages).
German-language Written Opinion (PCT/ISA/237) issued in PCT Application No. PCT/EP2016/055908 dated Jun. 2, 2016 (Four (4) pages).
German-language Office Action issued in counterpart German Application No. 10 2015 104 183.9 dated Jan. 8, 2016 (Seven (7) pages).
Chinese-language Office Action issued in counterpart Chinese Application No. 201680017065.4 dated Aug. 28, 2018 with English translation (16 pages).

* cited by examiner

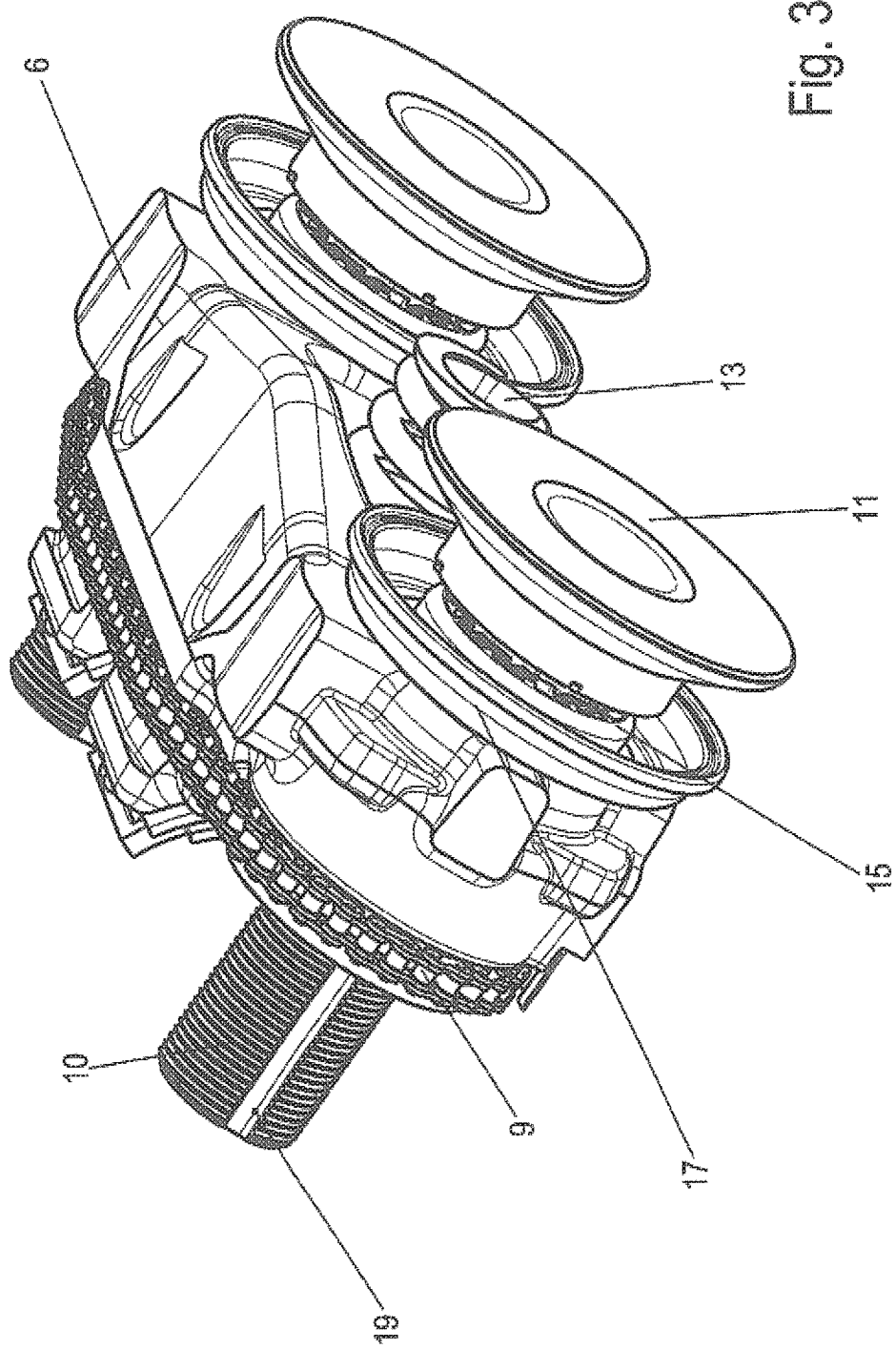

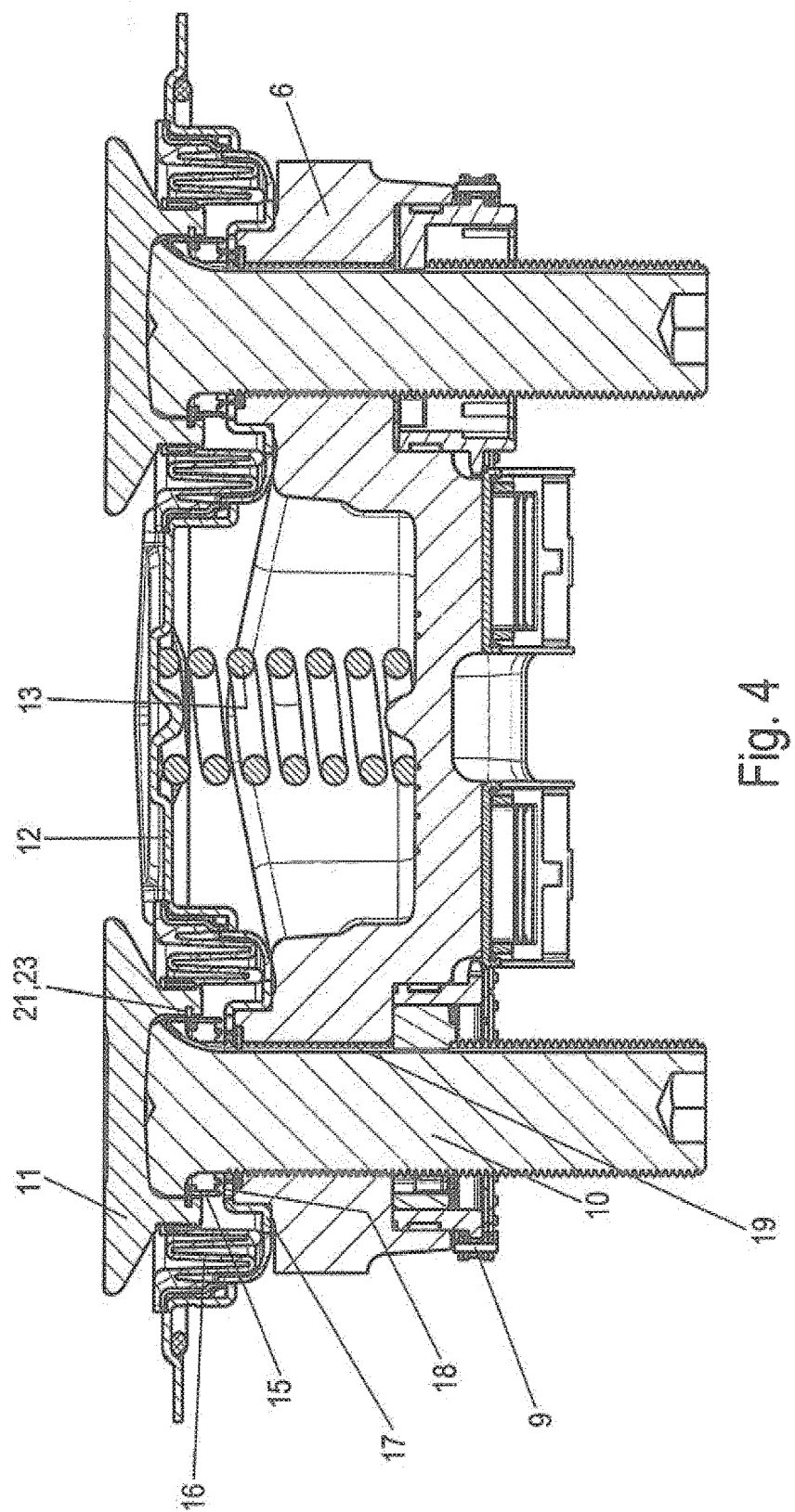

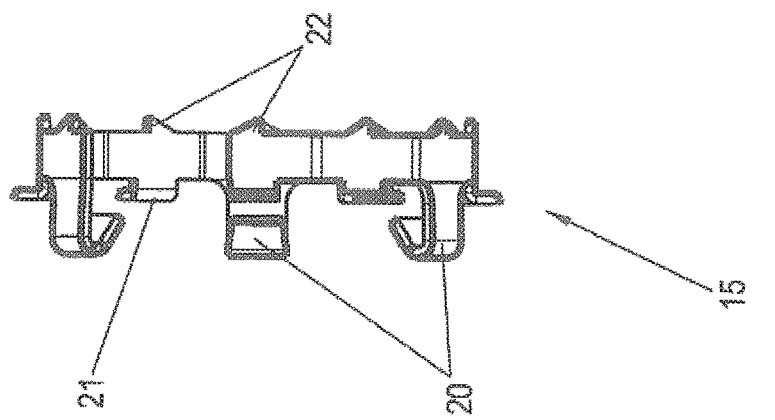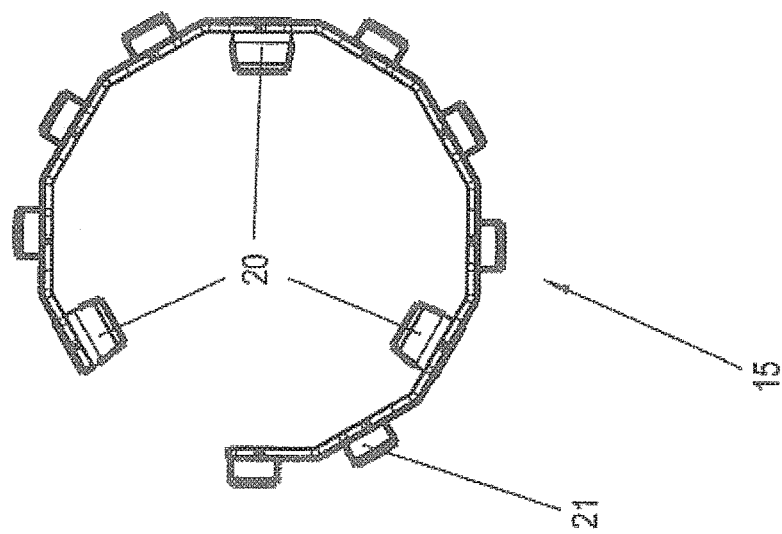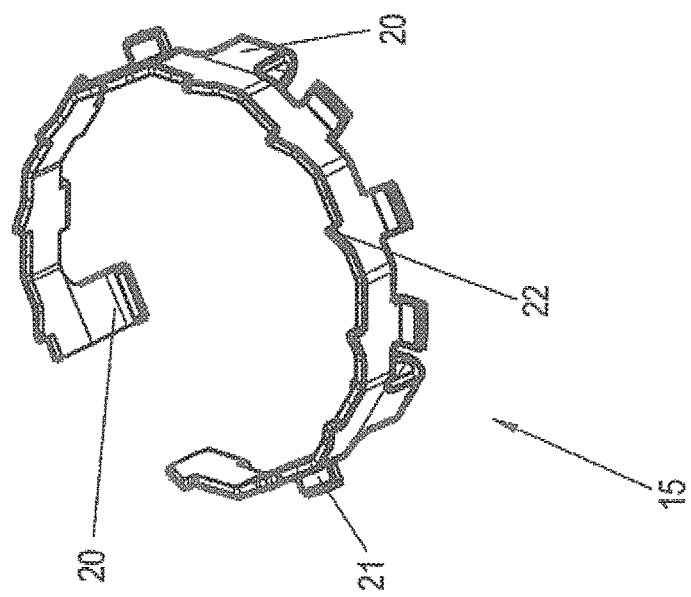

DISK BRAKE FOR A UTILITY VEHICLE

CROSS REFERENCE TO RELATED APPLICATIONS

This application is a continuation of PCT International Application No. PCT/EP2016/055908, filed Mar. 18, 2016, which claims priority under 35 U.S.C. § 119 from German Patent Application No. 10 2015 104 183.9, filed Mar. 20, 2015, the entire disclosures of which are herein expressly incorporated by reference.

BACKGROUND AND SUMMARY OF THE INVENTION

The invention relates to a disk brake for a utility vehicle.

A generic disk brake is disclosed in DE 94 22 342 U1. Said disk brake has a brake lever which, during a braking operation, acts on a bridge in which at least one actuating spindle is mounted in a relatively rotatable manner. Said actuating spindle has a thrust piece which, during actuation of the brake, is pressed against a brake pad as a result of displacement of the bridge.

For the compensation of a wear-induced change of a predetermined air gap, that is to say of the distance between the brake pad and the brake disk, a readjustment device is provided by means of which the actuating spindle is adjusted in the direction of the brake disk by relative rotation. For this purpose, the actuating spindle is equipped with an external thread which engages into a corresponding threaded bore of the bridge.

A receiving space of the brake caliper in which the bridge and the brake lever are positioned is closed off to the outside, that is to say towards the brake disk, by a closure plate through which the actuating spindle extends.

To seal off said passage region, a corrugated bellows is provided which is held at one side on the closure plate and at the other side on the thrust piece. Said corrugated bellows is normally composed of a highly elastic material, for example a silicone rubber, in order that it can cover the actuating spindle over the entire readjustment travel. For the restoring movement of the bridge after a braking action, a compression spring is arranged between the closure plate and the bridge.

With regard to the durability, that is to say the service life, of the bellows, problems arise from the fact that the relatively high temperatures generated during braking operations act on the bellows, such that said bellows, as a wearing part, must be exchanged.

However, owing to the restricted space conditions, this is possible only with considerable expenditure of work, which considerably adversely affects the maintenance costs of the disk brake.

Aside from the expenditure of time, it is necessary, for the exchange of the bellows, for the actuating spindle to be rotated backward by means of the readjustment device, wherein, in order to protect the latter, during the resetting and feed movements, a breakaway adapter is used which breaks in the event of a particular torque being exceeded and thus protects a readjuster of the readjustment device against overloading. Furthermore, a disengagement prevention means is required for the readjustment device, because otherwise the actuating spindle becomes axially braced against the readjuster, which has the effect that a greater torque is required for a release than can be transmitted by the breakaway adapter.

DE 10 2008 010 462 A1 has disclosed a disk brake, the bridge of which has not a threaded bore but rather a blind bore in which a pressure plunger is mounted so as to be capable of performing tilting movements, wherein the pressure plunger is held in an axially secured but relatively rotatable manner in the bridge by means of a coupling ring which lies in circumferential grooves of the bridge, at one side, and of the pressure plunger, at the other side. Moreover, the pressure plunger is not equipped with a thrust piece which is rotatable relative to said pressure plunger, it rather being the case that the thrust piece is an integral constituent part of the pressure plunger. In this respect, said literature represents prior art of a different generic type.

The invention is based on the object of further developing a disk brake of the generic type such that it can be produced and assembled more easily and inexpensively, and exchange of wearing parts is made simpler.

The new disk brake is characterized firstly in that it can be produced much more easily than has hitherto been the case. This is contributed to in particular by the fact that the disengagement prevention means for the readjustment device, as mentioned with regard to the prior art, can be dispensed with, because a backward-rotation prevention means is realized by means of the securing ring provided according to the invention.

It is known from the prior art for a traction mechanism drive of the readjustment device, the actuating spindles, the bridge and the closure plate as main constituent parts to be introduced as a preassembled structural unit into the receiving space of the brake caliper.

For this purpose, it is necessary for the entire structural unit to be braced together. The axial securing of the securing ring on the thrust piece fixes said thrust piece in the axial direction, such that the closure plate is pressed by said compression spring against the thrust piece, which in turn pulls on the actuating spindle via the securing ring and thus, owing to the self-locking action of the thread, braces together the components of the unit that are involved. Thus, much simpler assembly of the disk brake, which takes less time, is possible.

In an advantageous refinement of the invention, it is provided that the securing ring, in order to be secured against relative rotation on the actuating spindle, is equipped with axially extending spring arms which engage into axial grooves of the actuating spindle.

For the installation of the securing ring, the latter is of resilient form and has a slot extending all the way through, such that, by being spread open, it can be guided over a head integrally formed on the actuating spindle, in particular during an exchange of the bellows and of the thrust piece. Here, after passing over the head of the actuating spindle, the securing ring is pressed together, for which purpose its outer diameter is smaller than the inner diameter of the thrust piece.

For the axial securing of the securing ring to the thrust piece, the securing ring has radially oriented tabs distributed over the circumference, which tabs engage into a circumferential inner groove of the thrust piece owing to the restoring forces of the resilient securing ring.

By means of the abovementioned relative-rotation prevention by means of the spring arms which engage into the axial grooves of the actuating spindle, the securing ring is rotated conjointly during the rotation of the actuating spindle. This permits a backward-rotation prevention action in interaction with the ring of a secondary seal of the bellows, which at one side is connected to the bridge, by frictionally locking fastening of the ring, and at the other side produces the frictionally locking connection of the bellows to the closure plate, wherein said bellows is connected to the ring of the secondary seal.

For the backward-rotation prevention action, lugs are provided on the securing ring on the side averted from the thrust piece, which lugs engage into cutouts of the ring in the event of the backward rotation of the actuating spindle.

Here, the webs formed between the cutouts are designed such that their width, converted by means of the transmission ratio of the thread of the actuating spindle, is jumped over in the case of an axial backward-rotation travel of for example 0.1 mm during the backward rotation. By contrast, the cutouts are of such a width that an axial backward-rotation travel of in this case 0.4 mm is covered. Here, it must be ensured that the securing ring is not axially braced with the ring of the secondary seal. This is achieved by virtue of the fact that the spring arms of the securing ring are designed to be resilient in an axial direction, such that the 0.1 mm axial backward-rotation travel required for the jump-over of a web of the ring is absorbed by the spring action.

As mentioned, in the region of the thrust piece and thus in the region of the securing ring, high temperatures act on the components involved during the operation of the brake. This poses particular challenges with regard to the spring steel in order to prevent the annealing thereof.

The advantage of the described construction lies in the fact that very small spring travels are required, owing to the transmission ratio of the thread pitch, normally M24-4P2, of 0.1 mm, in that the stresses occurring here in the securing ring lie below the Rp0.2 value of the base material, for example DIN EN 10132-4-C67S. Thus, an axial spring action is realized even in the annealed state of the securing ring.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows the assembly as per FIG. 2 in an operating position, in a perspective view.

FIG. 4 shows the assembly as per FIG. 3 in a sectional plan view.

FIGS. 5A-5C show a detail of the FIG. 1 disk brake in multiple different views.

DETAILED DESCRIPTION OF THE DRAWINGS

Figure 1:
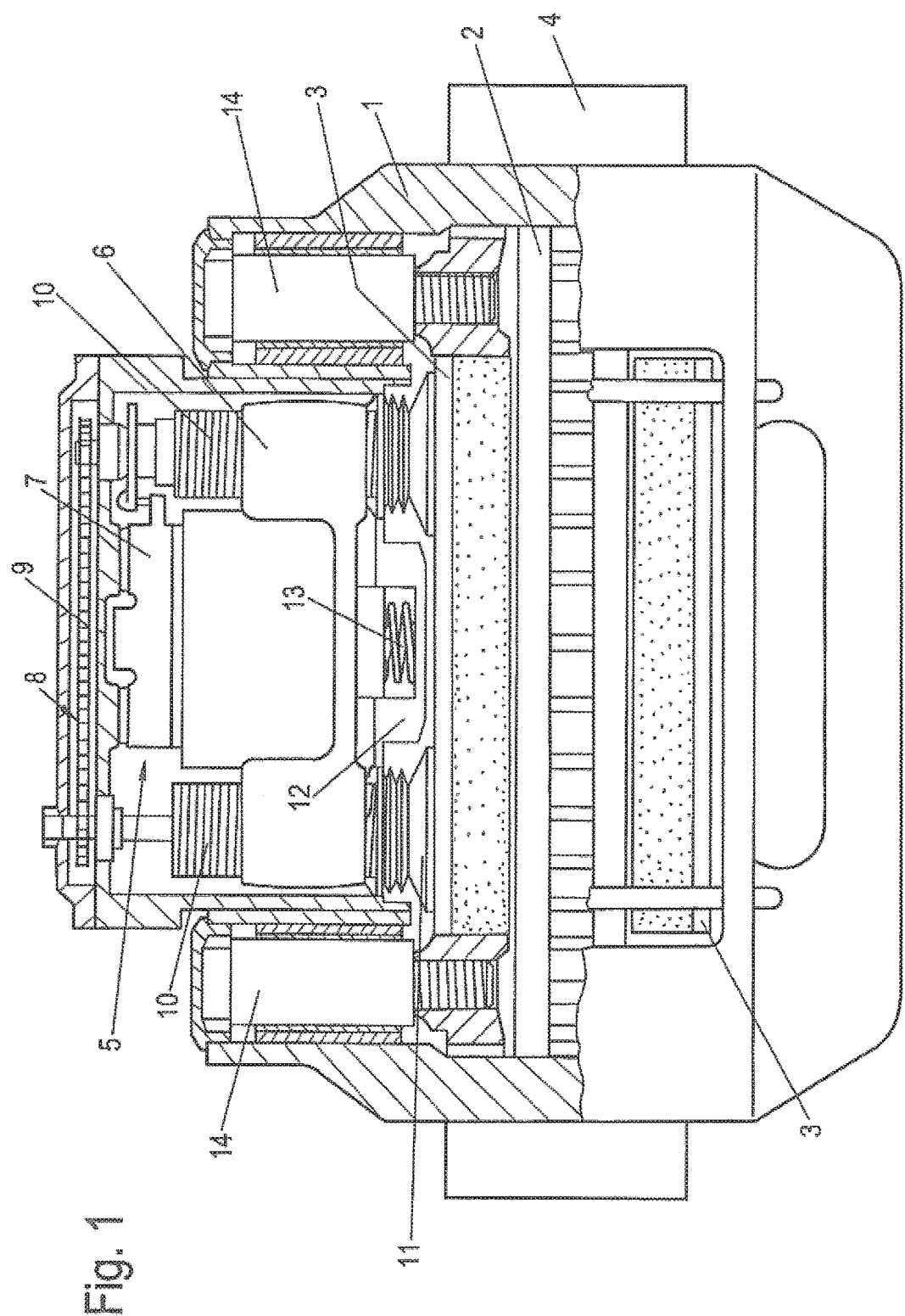
FIG. 1 shows a disk brake in accordance with the present invention in a partially sectional plan view.

FIG. 1 illustrates a disk brake for a utility vehicle, having a brake caliper 1 which engages over a vehicle-side brake disk 2 and which is mounted on a brake carrier 4 by means of guide rods 14 so as to be axially displaceable relative to the brake disk 2.

In the brake caliper 1, there is arranged an application device 5, having a brake lever 7 which acts on a bridge 6 during a braking operation. In the example, two actuating spindles 10 which are arranged parallel to and spaced apart from one another are held in said bridge. The actuating spindles bear in each case one thrust piece 11 facing toward the brake disk 2. During a braking operation, the thrust pieces 11 can be pressed against an associated brake pad 3 which is pressed against the brake disk 2. An oppositely situated, reaction-side brake pad 3 is correspondingly pressed against the brake disk 2 as the brake caliper is axially displaced in response to the actuation of application device 5.

For the compensation of a changing air gap, that is to say the distance between the brake pad 3 and the brake disk 2 during actuation of the brake, the actuating spindles 10 are rotatable in the direction of the brake disk 2 by a readjustment device 8. For this purpose, the actuating spindles 10 are equipped with an external thread which engages into an internal thread of the bridge 6.

For the synchronization of the readjustment, a traction mechanism drive is provided, having a traction mechanism 9, for example in the form of a chain.

For the resetting of the bridge 6 after a release of the brake, a compression spring 13 is provided which is supported at one side on the bridge 6 and at the other side on a closure plate 12. The closure plate closes off a receiving space which receives the application device 5 of the brake caliper 1, on the side facing toward the brake disk 2. The closure plate is in this case fixedly connected to the brake caliper 1, for example by screw connection.

Figure 2:
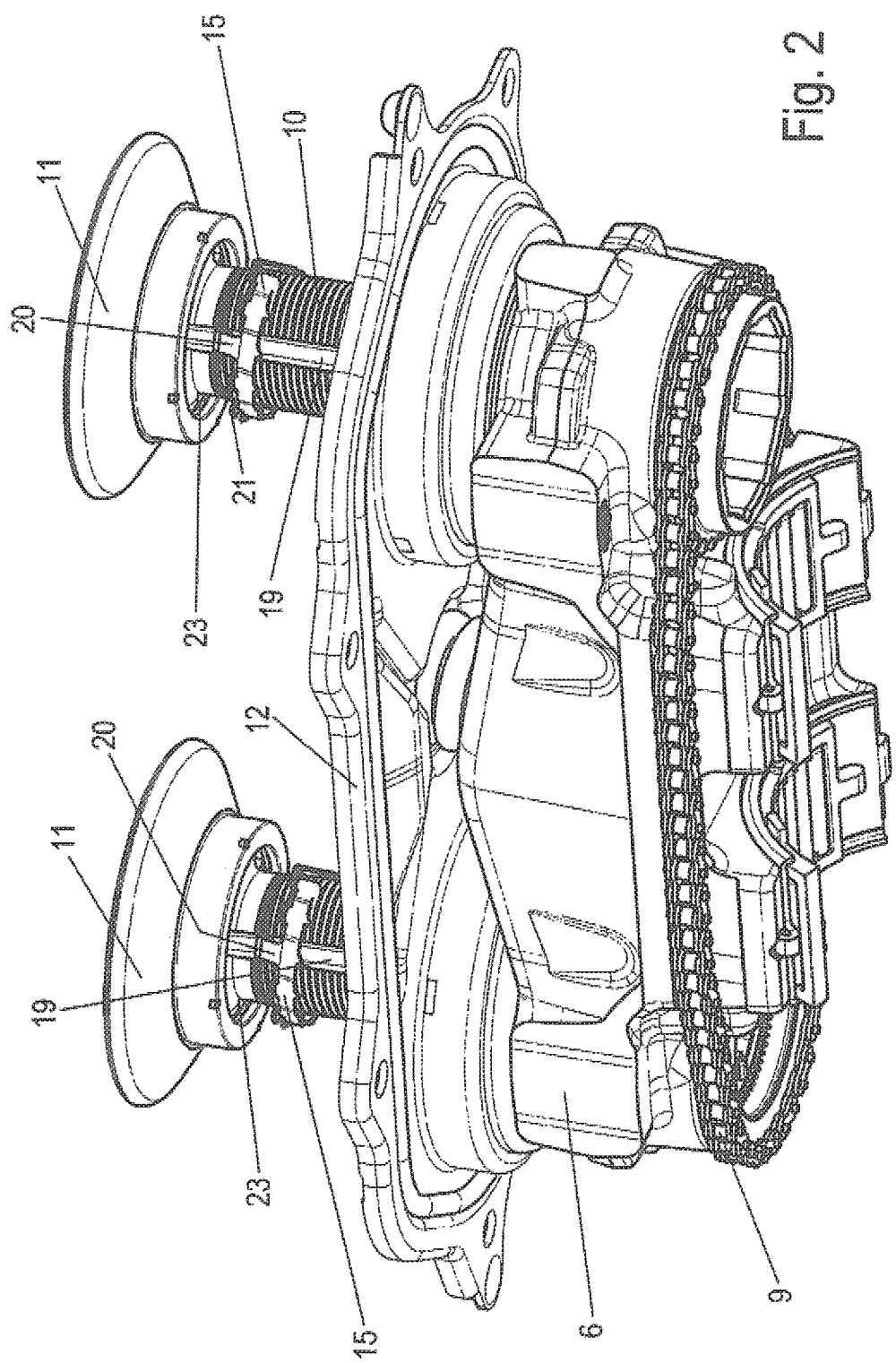
FIG. 2 shows an assembly of the FIG. 1 disk brake in a partially exploded illustration.

FIGS. 2 and 3 illustrate a part of the disk brake which, as a preassembled structural unit, is composed of the bridge 6, the traction mechanism drive 9, the actuating spindles 10 and the thrust pieces 11 and the closure plate 12. The completed unit is inserted into the brake caliper 1.

According to the invention, a securing ring 15 is arranged on the respective actuating spindle 10 in a manner secured against relative rotation. The associated thrust piece 11 is held on the respective actuating spindle 10 in an axially secured and relatively rotatable manner.

For the securing to the actuating spindle 10 in a manner secured against relative rotation, the securing ring 15 has spring arms 20 which engage into axial grooves 19 of the actuating spindles 10.

FIG. 2 shows a pre-assembled position of the thrust pieces 11 with respect to the actuating spindles 10, whereas FIGS. 3 and 4 each show the assembled position of the thrust pieces 11.

In FIG. 4, it can moreover be seen that the passage region of the actuating spindles 10 through the closure plate 12 is sealed off in each case by means of a bellows 16, in this case a corrugated bellows, which is held at one side on the thrust piece 11 and at the other side on the closure plate 12.

For the latter fastening, a secondary seal 17 is provided in the manner of a pot with a ring as a dimensionally stable component and which is pressed into the passage opening of the closure plate 12 and on which the bellows 16 is held, whereas the secondary seal 17 is fastened at the other side to the bridge 6.

The securing ring 15 is shown as a detail in FIG. 5, wherein FIG. 5A shows a perspective view, FIG. 5B shows a plan view, and FIG. 5C shows a side view.

It can be seen in particular in FIG. 5B that the securing ring 15 has a polygonal contour, the corners of which bear against the wall of an opening of the thrust piece 11 which receives a thickened head of the actuating spindle 10. The securing ring 15, which is formed from spring steel, has a slot extending axially all the way through, such that it can be easily spread open.

In this way, the securing ring 15 can be pushed over the thickened head of the actuating spindle 10 until it has been brought into an end position behind the thickened head. The spring arms 20 then lie with inwardly angled limbs in the axial grooves 19 of the actuating spindle 10. In the example, three axial grooves 19 and spring arms 20 are provided, which are arranged at equal angular intervals with respect to one another.

It can furthermore be clearly seen in FIG. 5 that the securing ring 15 has radially outwardly directed tabs 21 which, for the axial securing of the thrust piece 11, engage into an encircling groove 23 of the opening of the thrust piece 11 which receives the thickened head of the actuating spindle 10.

On the side averted from the tabs 21, lugs 22 are integrally formed on the securing ring 15. The lugs 22 engage into cutouts 18 of the ring of the secondary seal 17 in the event of a backward rotation of the actuating spindle 10 (FIG. 4).

Figure 6A:
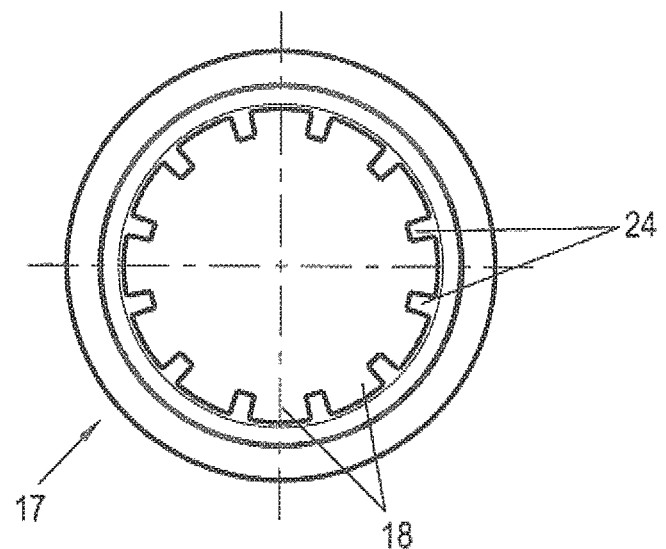
FIGS. 6A-6B shows a further detail of the FIG. 1 disk brake in multiple different views.
Figure 6B:
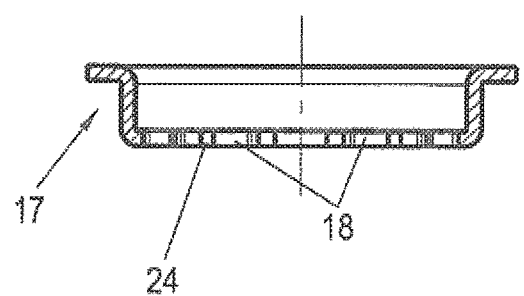

FIG. 6 illustrates the secondary seal 17 as a detail, specifically in a plan view in FIG. 6A and in a sectional side view in FIG. 6B.

Here, webs 24 formed between the recesses 18 are designed such that their length in the direction of rotation, converted by the transmission ratio of the thread of the actuating spindle 10, is jumped over in the case of an axial backward-rotation travel of 0.1 mm during the backward rotation of the actuating spindle 10. By contrast, the recesses 18 are dimensioned in the same direction such that an axial backward-rotation travel of 0.4 mm is covered.

It must be ensured that the securing ring 15 is not axially braced with the secondary seal 17. This is achieved by virtue of the fact that the spring arms lying in the axial grooves 19 are designed to be resilient in an axial direction, such that the 0.1 mm axial backward-rotation travel required for the jump-over of a web 24 on the secondary seal 17 is absorbed by the spring action.

During the further backward rotation of the actuating spindle 10, the flanks of the lugs 22 of the securing ring 15 come into contact with the flanks of the webs 24 of the secondary seal 17, and the acting torque of for example approximately 35 Nm is absorbed only in the circumferential direction. The interference fit of the secondary seal 17 with respect to the bridge 6 is configured such that said torque can be transmitted.

Although the contact area between the securing ring 15 and the secondary seal 17 is very small, local plasticization occurs on the secondary seal 17, but this does not constitute a problem because, firstly, a further jump-over of a web 24 is ensured by the available axial backward-rotation travel, and the function of the backward rotation is normally required only 10 times over the service life of the brake.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Brake caliper
2 Brake disk
3 Brake pad
4 Brake carrier
5 Application device
6 Bridge
7 Brake lever
8 Readjustment device
9 Traction mechanism
10 Actuating spindle
11 Thrust piece
12 Closure plate
13 Compression spring
14 Guide rod
15 Securing ring
16 Bellows
17 Secondary seal
18 Recess
19 Axial groove
20 Spring arm
21 Tab
22 Lug
23 Groove
24 Web

What is claimed is:

1. A disk brake for a utility vehicle, comprising:
a brake caliper configured to straddle a brake disk, the brake caliper including
at least one application device arranged in a region of the brake caliper configured to receive the at least one brake application device,
a guided bridge configured to displace the at least one application device in a direction toward the brake disk,
an actuating spindle configured to be supported in a bore of the guided bridge,
a closure plate configured to close the region of the brake caliper configured to receive the at least one brake application device, the closure plate having an aperture through which the actuating spindle extends in the direction toward the brake disk,
a thrust piece axially and rotatably supported on the actuating spindle between the actuating spindle and a brake pad configured to be pressed against the brake disk,
a readjustment device configured to adjust an air gap between the brake disk and the brake pad, the readjustment device being operatively connected to the actuating spindle,
a bellows configured to seal off a passage region of the actuating spindle at the closure plate aperture, the bellows having an outer circumferential portion configured to be connected to the closure plate and an inner circumferential portion configured to be connected to the thrust piece, and
a securing ring configured to be located in an non-rotating manner on the actuating spindle and on the thrust piece in an axially secured and relatively rotatable manner.

2. The disk brake as claimed in claim 1, wherein the securing ring is held in positively locking fashion on the actuating spindle.

3. The disk brake as claimed in claim 2, wherein the securing ring has spring arms configured to lie in axial grooves of the actuating spindle.

4. The disk brake as claimed in claim 3, wherein the securing ring is composed of a resilient material.

5. The disk brake as claimed in claim 4, wherein the resilient material is spring steel.

6. The disk brake as claimed in claim 5, wherein the securing ring has a slot configured to allow the securing ring to be installed in a radial direction onto the actuating spindle.

7. The disk brake as claimed in claim 6, wherein the thrust piece has an opening configured to receive a thickened head of the actuating spindle, and the securing ring has radially oriented tabs configured to engage into a circumferential groove on a wall of the thrust piece opening.

8. The disk brake as claimed in claim 7, wherein a diameter of the securing ring prior to installation on the actuating spindle is smaller than a diameter of the thickened head of the actuating spindle.

9. The disk brake as claimed in claim 8, wherein the securing ring has axially oriented lugs configured to lie in recesses of a pot-shaped secondary seal, and an outer circumferential portion the pot-shaped secondary seal is pressed into the opening of the closure plate and an inner circumferential portion of the pot-shaped secondary seal is fastened to the guided bridge.

10. The disk brake as claimed in claim 9, wherein the pot-shaped secondary seal has a plurality of recesses arranged circumferentially around a radially inner surface of the inner circumferential portion.

11. The disk brake as claimed in claim 10, wherein a circumferential length of each of the plurality the recesses is greater than a circumferential length of each of a plurality of webs between adjacent ones of the plurality of recesses.

12. The disk brake as claimed in claim 11, wherein the securing ring has a polygonal circumferential contour.

13. The disk brake as claimed in claim 12, wherein the spring arms each have a limb angled radially inward which is configured to lay in a corresponding one of the actuating spindle axial grooves.

14. The disk brake as claimed in claim 13, wherein the axial grooves are uniformly spaced about the circumference of the actuating spindle.

15. The disk brake as claimed in claim 4, wherein the securing ring is composed of spring steel.

* * * * *